United States Patent [19]

Sugiyama

[11] 4,415,936

[45] Nov. 15, 1983

[54] JITTER COMPENSATION SYSTEM IN A ROTARY RECORDING MEDIUM REPRODUCING APPARATUS

[75] Inventor: Hiroyuki Sugiyama, Isehara, Japan

[73] Assignee: Victor Company of Japan, Ltd., Yokohama, Japan

[21] Appl. No.: 296,490

[22] Filed: Aug. 26, 1981

[30] Foreign Application Priority Data

Aug. 28, 1980 [JP] Japan .................................. 55-117785

[51] Int. Cl.³ .............................................. H04N 9/44
[52] U.S. Cl. .................................... 358/322; 358/326
[58] Field of Search ............... 358/310, 327, 330, 342, 358/320–326; 369/43

[56] References Cited

U.S. PATENT DOCUMENTS

| | | | |
|---|---|---|---|
| 3,787,616 | 1/1974 | Falk et al. | |
| 3,871,020 | 3/1975 | Wilber | 358/322 X |
| 3,873,990 | 3/1975 | Wilber | 358/322 X |
| 3,940,556 | 2/1976 | Boltz, Jr. | 369/43 X |
| 3,965,482 | 6/1976 | Burries | 358/322 |
| 3,967,311 | 6/1976 | Fuhrer | 358/322 |
| 4,170,783 | 10/1979 | Tajima | 369/43 |
| 4,190,859 | 2/1980 | Kinjo | 358/342 X |
| 4,313,129 | 1/1982 | Fukui | 358/322 X |

FOREIGN PATENT DOCUMENTS 2422063  4/1976  Fed. Rep. of Germany .
2746573  4/1978  Fed. Rep. of Germany .

*Primary Examiner*—Aristotelis M. Psitos
*Attorney, Agent, or Firm*—Louis Bernat

[57] ABSTRACT

A jitter compensation system is used for a rotary recording medium reproducing apparatus having a reproducing transducer including a reproducing element for reproducing a color video signal from a rotary recording medium, where the color video signal has a carrier chrominance signal which has been converted into a low frequency range. The jitter compensation system comprises a separation circuit for separating a horizontal synchronizing signal from the color video signal reproduced by the reproducing transducer, a carrier chrominance signal separation circuit for separating a carrier chrominance signal from the color video signal reproduced by the reproducing transducer, a voltage controlled oscillator, a phase comparator supplied with the separated horizontal synchronizing signal and an output signal of the voltage controlled oscillator, for comparing phases of the signals supplied thereto and supplying an output error signal to the voltage controlled oscillator to control the oscillation frequency of the voltage controlled oscillator, a displacing mechanism responsive to the output error signal of the phase comparator, for displacing the reproducing element of the reproducing transducer towards a relative scanning direction with respect to the rotary recording medium, a frequency converter for frequency-converting the frequency of the separated carrier chrominance signal back to the original frequency, and a circuit for producing a signal for frequency conversion which is to be supplied to the frequency converter from the outputs of the voltage controlled oscillator and the frequency converter. The above phase comparator and the voltage controlled oscillator construct a phase locked loop.

4 Claims, 2 Drawing Figures

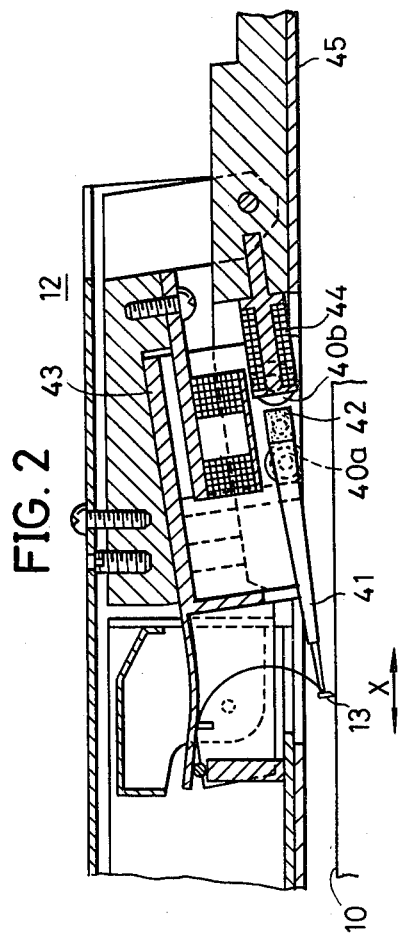

JITTER COMPENSATION SYSTEM IN A ROTARY RECORDING MEDIUM REPRODUCING APPARATUS

BACKGROUND OF THE INVENTION

The present invention generally relates to jitter compensation systems in rotary recording medium reproducing apparatuses, and more particularly to a jitter compensation system which uses a phase locked loop to drive a jitter compensation mechanism for a reproducing element of a reproducing transducer by an output of the phase locked loop, and compensate the jitter of a carrier chrominance signal of a reproduced color video signal in a reproducing circuit.

Reproducing apparatuses have been reduced to practical use, in which a recorded signal in a rotary recording medium (hereinafter simply referred to as a disc) in which an information signal such as a video signal and an audio signal is recorded as a variation in geometrical configuration, is reproduced as a variation in electrostatic capacitance between an electrode of a reproducing stylus of the reproducing transducer and the recording surface of the disc. However, when irregularity (wow and flutter) exists in the rotation of the turntable on which the disc is placed to rotate therewith, eccentricity exists in the center hole of the disc, distortion is introduced in the disc upon molding of the disc, and the like, jitter (error in the time axis) is introduced in the reproduced signal. The above jitter covers a frequency range form a relatively low frequency component corresponding to the rotational period of the disc due to such causes as the above irregular rotation and eccentric center hole, to a relatively high frequency component due to such causes as the above distortion in the disc, mainly, few hundreds Hz to 1.5 kHz.

In a case where the reproduced information signal is a color video signal, the above jitter gives rise to color shading, swinging of picture image in the reproduced picture of the receiver, and the quality of the reproduced picture greatly deteriorates.

Accordingly, in a conventional system (e.g. U.S. Pat. No. 3,967,311 granted to Fuhrer on June 29, 1976), a chrominance subcarrier of the reproduced color video signal, which has been frequency converted into a low frequency range, is frequency-converted (hererodyne-converted) back to the original chrominance subcarrier frequency, and the phases of this chrominance subcarrier which is frequency-converted into the original chrominance subcarrier frequency, and a reference signal are compared. An output error signal obtained as a result of the above phase comparison controls an oscillator which generates a signal for performing the above frequency conversion, to reduce the error in the time axis upon frequency conversion. Furthermore, the cantilever which is provided with the reproducing stylus at the tip end thereof, is displaced towards a relative scanning direction of the reproducing stylus with respect to the disc, by the above output error signal. Hence, in the above conventional system, jitter compensation was performed by performing the above control operation in order to prevent the introduction of error in the time axis.

However, in the above conventional system, the output error signal obtained as a result of the phase comparison is established so as to have a characteristic suited for controlling the oscillator which generates the signal for performing the above frequency conversion. Therefore, the above output error signal is not necessarily suited for driving a jitter compensation mechanism (so-called arm stretcher) which displaces the above cantilever. Moreover, there was a disadvantage in that even when phase compensation is performed on the above ouput error signal, the jitter compensation cannot be sufficiently performed.

In addition, as another conventional system, e.g. as described in column 1, lines 54 to 62 of U.S. Pat. 3,967,311, granted to Fuhrer on June 29, 1976; there was a jitter compensation system provided with a first circuit system which compares the phases of the horizontal synchronizing signal obtained from the reproduced color video signal and the output signal of a crystal oscillator, to drive the jitter compensation mechanism for the reproducing transducer by the output error signal, obtained as a result of the phase comparison. Another system was tested that has a second circuit system which compares the phases of the carrier chrominance signal, which has been converted into a low frequency range and separated from the reproduced color video signal and the output signal of a crystal oscillator, to control the oscillation frequency of a voltage controlled oscillator which produces a signal for frequency-converting the frequency of the carrier chrominance signal, which has been converted into the low frequency range, back to the original frequency.

However, in the tested system, the above first and second circuit systems are constructed to operate independently without having a mutual relationship with each other. Accordingly, the circuit system became large as a whole, and the construction of the system became complex. Hence, there were disadvantages in that the circuit system could not be simplified, and the system could not be manufactured at low cost.

SUMMARY OF THE INVENTION

Accordingly, it is a general object of the present invention to provide a novel and useful jitter compensation system in a rotary recording medium reproducing apparatus, in which the above described disadvantages have been overcome.

Another and more specific object of the present invention is to provide a jitter compensation system in a rotary recording medium reproducing apparatus provide with a jitter compensation circuit for comparing phases of a horizontal synchronizing signal separated from a color video signal reproduced from a rotary recording medium and an output of an oscillator, to supply an error signal obtained as a result of the phase comparison to a jitter compensation mechanism, and a frequency converting circuit for frequency-converting a carrier chrominance signal, which has been converted into a low frequency range, separated from the reproduced color video signal by the oscillator output, to convert the frequency of the carrier chrominance signal which has been converted into the low frequency range back to the original frequency, in which the jitter compensation circuit is constructed from a phase locked loop, and an output of a voltage controlled oscillator of the phase locked loop is used in combination for a jitter compensation signal which is compared with the phase of the horizontal synchronizing signal, and a carrier chrominance signal frequency-converting signal for performing subtraction with the carrier chrominance signal which has been converted into the lower frequency range.

Other objects and further features of the present invention will be apparent from the following detailed description when read in conjunction with the accompanying drawings.

BRIEF DESCRIPTION OF THE DRAWINGS

FIG. 2 is a side view, in vertical cross-section, showing an example of a reproducing transducer provided with a jitter compensation mechanism.

DETAILED DESCRIPTION

Figure 1:
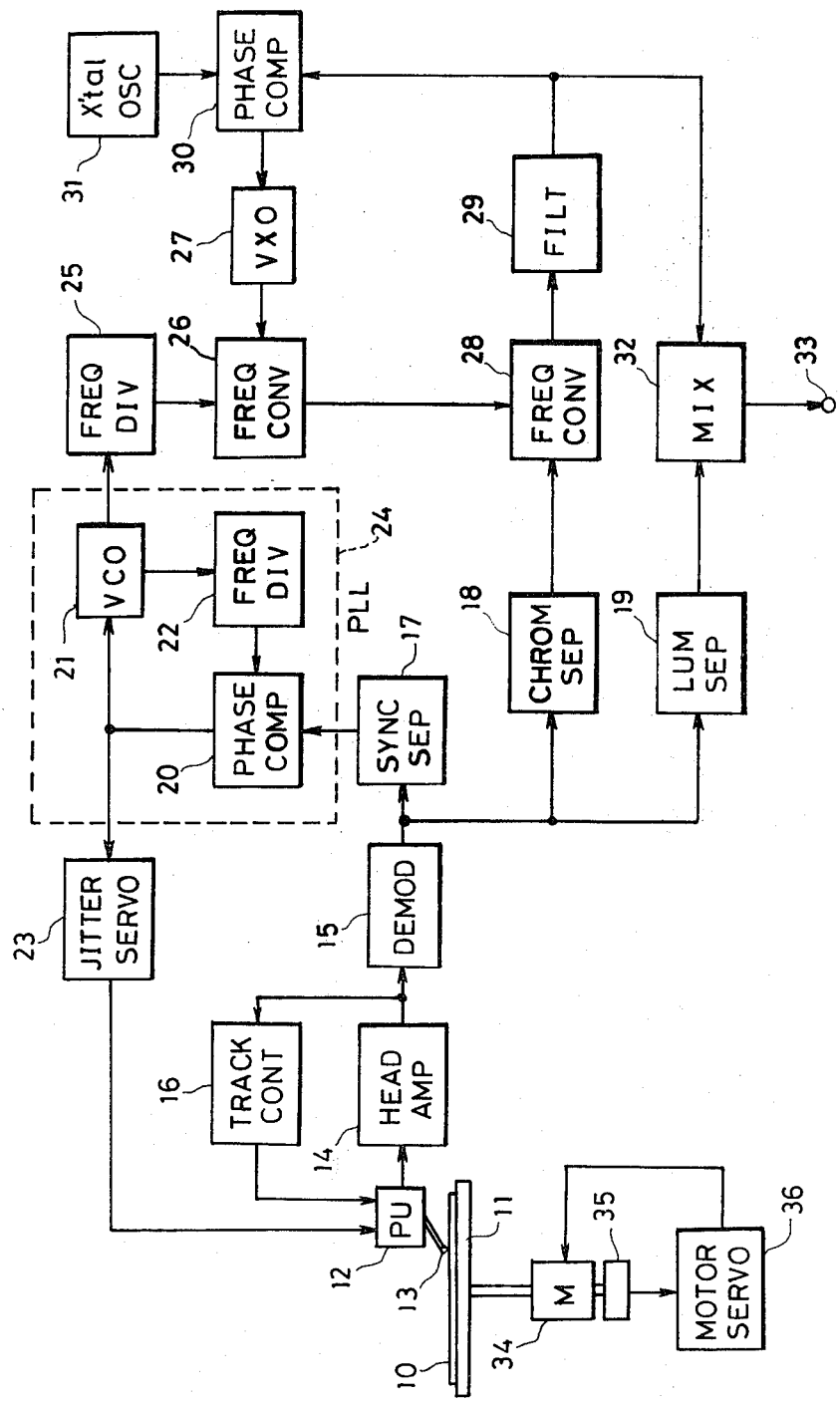
FIG. 1 is a systematic block diagram showing an embodiment of a jitter compensation system in a rotary recording medium reproducing apparatus according to the present invention.

In FIG. 1, a disc 10 is rotated at a predetermined speed by a turntable 11. A reproducing stylus 13 of a signal pickup device 12 makes contact with the recording surface of the disc 10, to pickup and reproduce the recorded signal from the disc 10. In the present embodiment of the invention, a color video signal is recorded on the disc 10 as variations in geometrical configuration, and the recorded color video signal is reproduced from the disc 10 as variations in electrostatic capacitance between the disc 10 and an electrode of the reproducing stylus 13. Further, reference signals for performing tracking control are recorded on the disc 10 besides the video signal, and these reference signals are reproduced together with the color video signal.

The signal picked up and reproduced from the disc 10, is supplied to a demodulator 15 and a tracking control circuit 16 through a head amplifier 14. Reference signals for tracking control are separated at the tracking control circuit 16, and a tracking control signal is formed from these reference signals. The tracking control signal thus formed by the tracking control circuit 16 is supplied to coils for tracking 40a and 40b (shown in FIG. 2) in the pickup device 12. Accordingly, tracking control is performed so that the reproducing stylus 13 accurately scans on the video signal tracks on the disc 10.

In the signal pickup device 12 shown in FIG. 2, the reproducing stylus 13 is fixed at the tip end of a cantilever 41. The cantilver 41 is fitted and provided with a permanent magnet 42 at the rear end thereof. The rear end part of the cantilever 41 is supported at a lower part of a pickup cartridge frame 43 by a resilient support member (not shown). A coil 44 for jitter compensation, is provided at the rear along an axial line of the cantilever 41. The signal pickup device 12 is provided on a carriage 45, and the reproducing stylus 13 is transferred along the radial direction of the disc 10 when the carriage 45 is transferred.

In FIG. 1, the color video signal including a jitter component which is demodulated at the demodulator 15, is supplied to a synchronizing signal separation circuit 17, a carrier chrominance signal separation circuit 18, and a luminance signal separation circuit 19. A horizontal synchronizing signal which is separated at the synchronizing signal separation circuit 17 is supplied to a phase comparator 20. The horizontal synchronizing signal has a frequency $f_H$ (15.734 kHz in the case of the NTSC system). An output signal of a frequency of $325f_H$ (approximately 5.11 MHz) from a voltage controlled oscillator (hereinafter simply referred to as a VCO) 21 is supplied to a 1/325 frequency dividing circuit 22 and frequency divided thereat. The frequency divided output of the frequency dividing circuit 22 having a frequency of $f_H$ is supplied to the phase comparator 20 wherein the frequency divided output is compared with the horizontal synchronizing signal. An output error signal of the phase comparator 20 is supplied to a jitter servo circuit 23, wherein the phase of the error signal is compensated so as to match the operational characteristic of the signal pickup device 12. An output of the above jitter servo circuit 23 is supplied to the jitter compensation coil 44 of the signal pickup device 12. Accordingly, jitter compensation is performed displacing the cantilever 41 along the longitudinal direction of the cantilever 41, that is, along a relative scanning direction of the reproducing stylus 13 on the disc 10, so that the jitter is not introduced. The above direction along the relative scanning direction of the reproducing stylus 13 is indicated by an arrow X in FIG. 2.

On the other hand, the output signal of the phase comparator 20 is also supplied to the VCO 21 to control the output oscillation frequency of the VCO 21. The above phase comparator 20, VCO 21, and the 1/325 frequency dividing circuit 22 respectively construct a phase locked loop (hereinafter simply referred to as PLL) 24. A jitter compensation circuit for a jitter compensation mechanism of the signal pickup device 12 including the jitter compensation coil 44, is constructed by the above PLL 24 and the jitter servo circuit 23. The VCO 21 is controlled by the output error signal of the phase comparator 20 which is obtained as a result of phase comparison performed between the horizontal synchronizing signal including the jitter component and the output signal of the 1/325 frequency dividing circuit 22, so that the jitter component decreases. Hence, the oscillation frequency of the VCO 21 changes according to the jitter component. Accordingly, jitter compensation is effectively performed, due to the supply of the output error signal of the phase comparator 20 to the jitter compensation mechanism.

The output of the VCO 21 is also supplied to a ½ frequency dividing circuit 25. The signal supplied to the frequency dividing circuit 25 is converted into a signal having a frequency of approximately 2.56 MHz after being frequency divided, and this frequency divided signal is supplied to a frequency converter 26. The signal from the frequency dividing circuit 25 is frequency-converted at the frequency converter 26 by an output oscillation signal of a voltage controlled crystal oscillator (hereinafter simply referred to as VXO) 27 having a frequency of 3.58 MHz. Therefore, a signal having a frequency equal to the sum of the two frequencies, that is, 2.56 MHz and 3.58 MHz, is accordingly obtained, and this signal having a frequency of 6.14 MHz is supplied to a frequency converter 28.

The carrier chrominance signal separation circuit 18 separates the carrier chrominance signal from a color video signal supplied from the demodulator 15. The above color video signal recorded in the disc 10 consists of a luminance signal, and a carrier chrominance signal which has been converted into a low frequency range so that the chrominance subcarrier frequency of 3.58 MHz becomes 2.56 MHz. Accordingly, the chrominance subcarrier frequency of the carrier chrominance signal obtained from the carrier chrominance signal separation circuit 18 is 2.56 MHz.

The above carrier chrominance signal thus obtained is supplied to the frequency converter 28, and frequency divided by the signal from the frequency converter 26. Hence, a signal having a frequency which corresponds to the difference in the frequencies of the two signals, is obtained from the frequency converter 28. Therefore, the carrier chrominance signal which is converted into the low frequency range having a chrominance subcarrier frequency of 2.56 MHz, is returned to the carrier chrominance signal having the original chrominance subcarrier frequency of 3.58 MHz. When the frequency conversion is performed in the above frequency converter 28, the jitter component included in the carrier chrominance signal is accordingly compensated.

The ouput carrier chrominance signal of the frequency converter 28 is supplied to a filter 29 wherein the unwanted frequency component is eliminated, and then supplied to a phase comparator 30 and a mixer 32. The phase of the above carrier chrominance signal supplied to the phase comparator 30 is compared with the phase of an oscillation output signal from a crystal oscillator 31 having a frequency of 3.58 MHz. Moreover, an output error signal of the pahse comparator 30 is supplied to the VXO 27 to the control of oscillation frequency of the VXO 27.

The luminance signal separation circuit 19 separates the luminance signal from the color video signal supplied from the demodulator 15. The separated luminance signal is supplied to the mixer 32 wherein teh separated luminance signal is mixed with the carrier chrominance signal from the filter 29 which is returned to the original frequency of 3.58 MHz. Thus, a reproduced color video signal is accordingly obtained through an output terminal 33 and supplied to a receiver (not shown).

A motor 34 for driving the turntable 11 is rotationally controlled by an output of a motor servo circuit 36 which is supplied with an output of a rotation detector 35, so that the motor 34 rotates at a constant speed.

The rotational speed of the motor 34 is changed over by the motor servo circuit 36 according to whether the disc 10 which is to be reproduced is recorded with a color video signal of the NTSC system or a color video signal of the PAL or SECAM system. Since the rotational speed of the motor 34 is changed over according to the kind of disc being reproduced, even when the horizontal scanning frequencies differ in the NTSC system disc and the PAL or SECAM system disc, the signal can be reproduced as having the same horizontal scanning frequency in either case. Therefore, interchangeability exists, since the same VCO 21 or PLL 24 can be used for either case.

Further, this invention is not limited to these embodiments but various variations and modifications may be made without departing from the scope of the invention.

What is claimed is:

1. A jitter compensation system in a reproducing apparatus having a reproducing transducer including a reproducing element for reproducing a color video signal from a rotary recording medium, said color video signal having a carrier chrominance signal which has been converted into a low frequency range, said jitter compensation system comprising:

separation means for separating a horizontal synchronizing signal from the color video signal which is reproduced by said reproducing transducer;

carrier chrominance signal separation means for separating a carrier chrominance signal from the color video signal reproduced by said reproducing transducer;

first voltage controlled oscillator means;

first phase comparator means and said voltage controlled oscillator means constituting a phase locked loop;

said first phase comparator being jointly responsive to said separation means and to said oscillator means for comparing phases of the separated horizontal synchronizing signal and the output signal of said voltage controlled oscillator means for supplying an output error signal to said voltage controlled oscillator means in order to control the oscillation frequency thereof;

displacing means responsive to the output error signal of said phase comparator means, for displacing the reproducing element of said reproducing transducer toward a relative scanning direction with respect to said rotary recording medium;

first frequency converter means responsive to said carrier chrominance signal separating means for frequency-converting the frequency of said separated carrier chrominance signal back to the original frequency; and means responsive to the outputs of said voltage controlled oscillator means and said first frequency converter means for producing a signal for frequency conversion which is to be supplied to said frequency converter;

said first frequency converter means producing a signal having a frequency which is equal to the difference in frequencies from said signal for frequency conversion and said separated carrier chrominance signal, as a carrier chrominance signal having the original frequency, said means for producing a signal for frequency conversion comprising second frequency converter means responsive to the output oscillation signal of said first voltage controlled oscillator means, reference signal oscillator means, second phase comparator means jointly responsive to said first frequency converter means and to said reference signal oscillation means for comparing phases of output signals of said first frequency converter means and said reference signal oscillator means, and a second voltage controlled oscillator means responsive to said second phase comparator means for controlling the oscillation frequency thereof and for supplying an output oscillation signal to said second frequency converter means as a signal for frequency conversion, said output signal of said second frequency converter means being supplied to said first frequency converter means as the signal for frequency conversion.

2. A jitter compensation system as claimed in claim 1 in which said second voltage controlled oscillator is a voltage controlled crystal oscillator.

3. A jitter compensation system as claimed in claim 2 in which said phase locked loop further has a first frequency divider for frequency dividing the frequency of the output oscillation signal of said first voltage controlled oscillator to supply a frequency divided signal to said first phase comparator, and said means for producing the signal for frequency conversion further has a second frequency divider for frequency dividing the frequency of the output oscillation signal of said first voltage controlled oscillator to supply a frequency divided oscillation signal to said second frequency converter.

4. A jitter compensation system as claimed in claim 3 in which said first voltage controlled oscillator produces an oscillation frequency of $325f_H$ ($f_H$ is the horizontal synchronizing signal frequency), said first frequency divider frequency divides the frequency of the signal from said first voltage controlled oscillator by 1/325, said second frequency divider frequency divides the frequency of the signal from said first voltage controlled oscillator by ½, said reference signal oscillator oscillates a signal having a frequency of 3.58 MHz, said second voltage controlled oscillator oscillates a signal having a frequency of 3.58 MHz, said second frequency converter produces a signal having a frequency equal to the sum of the frequencies of the outputs of said second frequency divider and said second voltage controlled oscillator as a signal for frequency conversion, said first frequency converter produces a signal having a frequency equal to the difference in frequencies of the frequency conversion signal from said second frequency converter and said separated carrier chrominance signal, and the frequency of the frequency divided output signal of said second frequency divider is substantially equal to the frequency of said separated carrier chrominance signal.

* * * * *